United States Patent [19]
Kalina

[11] 4,214,353
[45] Jul. 29, 1980

[54] METHOD OF ASSEMBLING HEATED TERMINALS AND ROLLED FILM CAPACITORS WITHIN PLASTIC BOXES

[75] Inventor: Robert F. Kalina, Lombard, Ill.

[73] Assignee: Western Electric Company, Inc., New York, N.Y.

[21] Appl. No.: 974,152

[22] Filed: Dec. 28, 1978

[51] Int. Cl.² .............................................. H01G 4/32
[52] U.S. Cl. ................... 29/25.42; 29/619; 29/855; 338/276; 361/308
[58] Field of Search ............ 29/25.42, 628, 619; 174/52 PE; 361/307, 308, 309; 338/276, 273

[56] References Cited

U.S. PATENT DOCUMENTS

| | | | |
|---|---|---|---|
| 3,497,931 | 3/1970 | Rieman et al. | 29/25.42 |
| 3,857,074 | 12/1974 | Heywang et al. | 29/25.42 X |
| 4,003,125 | 1/1977 | Wallick | 29/695 R |
| 4,012,835 | 3/1977 | Wallick | 29/591 |

FOREIGN PATENT DOCUMENTS

| | | | |
|---|---|---|---|
| 2110871 | 6/1972 | France | 361/308 |
| 335144 | 9/1930 | United Kingdom | 361/308 |

OTHER PUBLICATIONS

"2-Lead DIP Ceramic Caps by AVX," *Electronic News,* Oct. 4, 1976, p. 48.

*Primary Examiner*—Carl E. Hall
*Attorney, Agent, or Firm*—R. P. Miller

[57] ABSTRACT

A pair of pointed terminals are heated and forced through opposed side walls of an open-ended box constructed of thermoplastic material. A rolled film capacitor blank having heat fusible end electrodes is moved into the box to deflect the terminals so that the terminals are forced into firm engagement with the end electrodes. The heated terminals are effective to soften or melt the engaged portions of the electrodes to bond the terminals to the capacitor blank.

8 Claims, 6 Drawing Figures

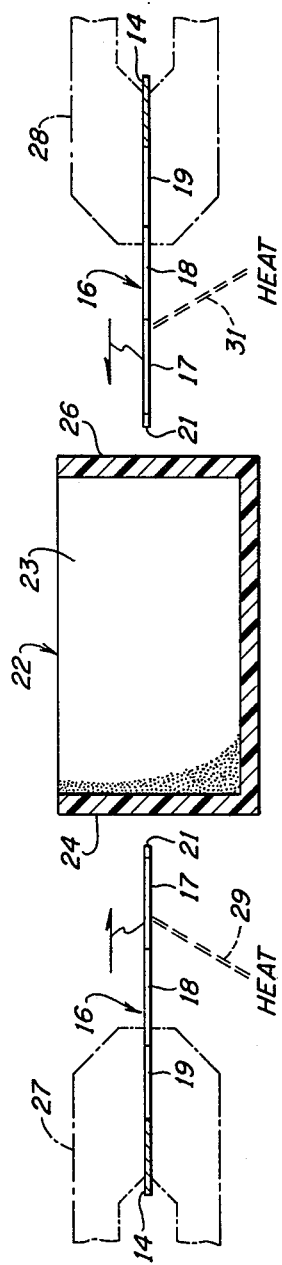
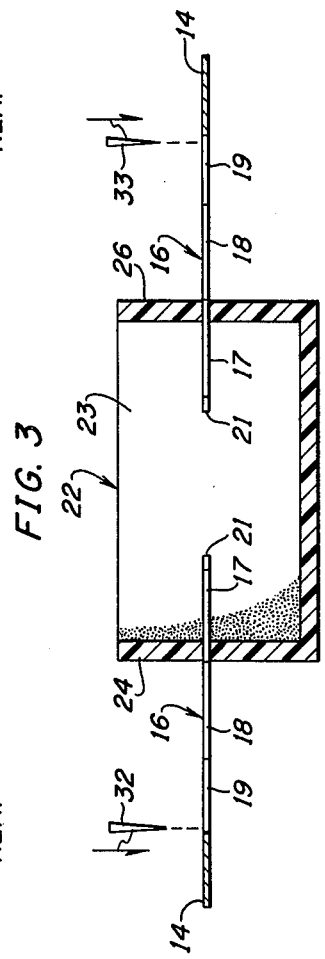
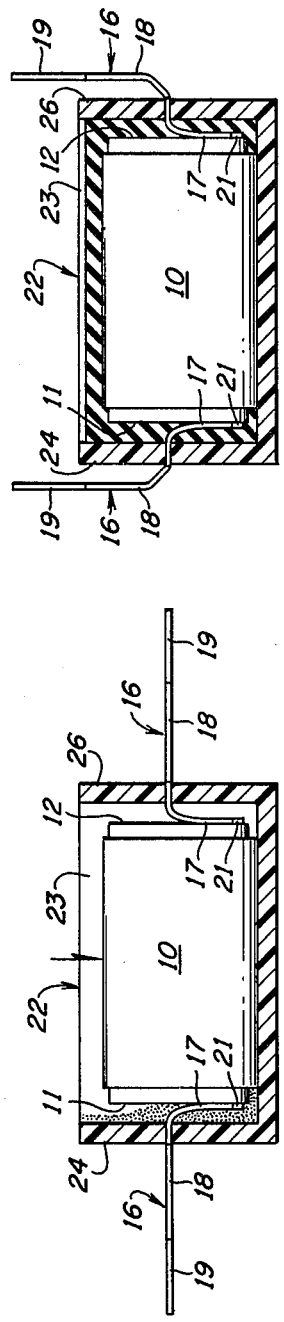
FIG. 3
FIG. 4
FIG. 5
FIG. 6

METHOD OF ASSEMBLING HEATED TERMINALS AND ROLLED FILM CAPACITORS WITHIN PLASTIC BOXES

TECHNICAL FIELD OF THE INVENTION

This invention relates to methods for assembling and heat bonding terminals to electrical devices or components within plastic boxes, and more particularly to an assembly method wherein heated terminals are moved through opposed walls of plastic boxes to be engaged by subsequently inserted rolled metallized film capacitors whereupon the capacitors are bonded to the terminals.

BACKGROUND OF THE INVENTION

Recent circuit design techniques contemplate the extensive use of miniature electrical and semiconductor components or modules which are readily machine insertable or bondable to circuit boards, substrates or other support structures. Many diverse combinations of various types of semiconductor devices and passive circuit elements have been packaged in small plastic cases or boxes known as DIP's (Dual In-Line Packages). Examples of methods and apparatus for assembling dual in-line packages are illustrated in U.S. Pat. Nos. 4,003,125 and 4,012,835, both issued to C. W. Wallick, wherein small boxed circuit modules are terminated by advancing opposed blanks of lead frames of terminals toward and onto metallized pads formed along opposed outer sides of the modules. The terminals are soldered to the pads to interconnect the terminals with the circuit elements within the modules. The dual in-line packages may be machine assembled on a support structure such as a circuit board, and then mass soldered using wave soldering facilities.

However, there is still a need to provide small packaged passive electrical devices such as resistors or capacitors which are readily susceptible to machine assembly into or onto circuit boards. One of the problem areas in the design of such devices resides in providing suitable methods for connecting or bonding terminal leads to the passive circuit elements contained within small boxes or cases constructed of plastic insulating material. Other problems also exist such as providing methods that minimize the number of assembly operations required to produce the packaged electrical devices. These assembly methods should also insure that the terminal leads are held in firm engagement with the circuit elements during the bondings of the terminals of the circuit elements to avoid introduction of added resistance at the bonding sites.

SUMMARY OF THE INVENTION

This invention contemplates, among other things, a method of assembling and heat bonding of terminals to electrical devices positioned within small plastic boxes. In one embodiment of the invention two opposed arrays of pointed terminals are simultaneously advanced toward a molded multi-compartment case constructed of thermoplastic material. The pointed terminals are heated to facilitate a penetration of opposed plastic walls of the compartments. The advanced heated terminals extend within the compartments so as to be engaged and deflected by the subsequent insertion of rolled film capacitors into the compartments. Each rolled film capacitor is provided with a pair of heat fusible or activated end electrodes which engage and deflect the terminals. The deflected terminals are held in firm engagement with the end electrodes whereupon the heat imparted to the terminals is effective to fuse or bond the electrodes to the terminals. The compartments may be then filled with an encapsulate and the leads severed and bent to provide parallel rows of leads comparable to those extending from other types of dual in-line packages.

BRIEF DESCRIPTION OF DRAWING

Other features and advantages of the present invention will be apparent upon consideration of the following detailed specification and the drawing, wherein:

FIG. 3 is a side elevational view, partially in section, showing facilities for advancing the terminals and for heating the terminals as the terminals are advanced through the side walls of the plastic case;

FIG. 4 is a side elevational view showing the terminals positioned within the plastic case and a pair of shear blades for severing the terminals from the lead frames;

FIG. 5 is a side elevational view, partially in section, depicting a rolled film capacitor inserted within a compartment to deflect the terminals into engagement with heat fusible end electrodes which are bonded to the body of the capacitor; and FIG. 6 is a side elevational view, partially in section, showing the capacitor embedded in an encapsulate and the leads bent to configurate the packaged capacitor in a manner similar to other dual in-line packaged circuit modules.

DETAILED DESCRIPTION

Figure 1:
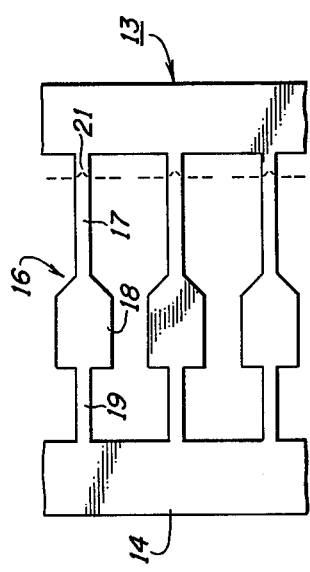
FIG. 1 is a plan view of a strip of material that has been stamped to provide an array of terminals.

The present invention is described in one embodiment as a method of packaging a rolled metallized film capacitor which is generally shown in FIGS. 5 and 6 of the drawing and designated by the reference numeral 10. Such a rolled film capacitor is manufactured by simultaneously winding a pair of films each having a metallized surface so that the metallized surface of each film is adjacent to the non-metallized surface of the other film. The initial metallizing is accomplished through a mask so that opposed non-metallized margins are at opposite edges of the wound films. The films are wound to offset one film with respect to the other to permit keying and firm bonding of end electrodes 11 and 12 of heat fusible or activated material such as zinc or solder. It is to be understood that the invention is described with respect to the packaging of a rolled film capacitor but the method is equally applicable to the packaging of other types of electrical components such as resistors or wound resistor-capacitor networks of the type shown in U.S. Pat. No. 3,939,440 issued to R. D. Berg et al., or laser scribed metallized film capacitors of the type described in application Ser. No. 974,182 filed on even date herewith in the names of W. J. Fanning and O. T. Masopust, Jr. and entitled METALLIZED FILM CAPACITOR AND METHOD OF MANUFACTURE.

Considering the principal embodiment of the invention, and with reference to FIG. 1, there is shown a sheet of flexible metal 13 which is stamped to provide a carrier strip 14 and an array of terminals 16 each of which includes a shank section 17, an enlarged insertion stop section 18 and a lead section 19. The sheet 13 may be constructed of a phosphor bronze which is tinned with tin or tin alloys to facilitate subsequent solder attachments to the end electrodes 11 and 12 of the capacitors 10. The shank sections 17 are cut to provide pointed ends 21.

Figure 2:
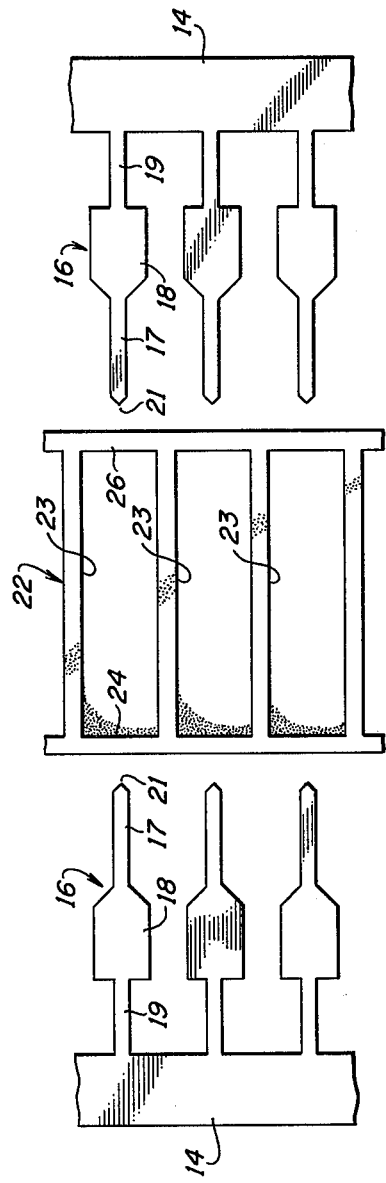
FIG. 2 is a plan view showing two arrays of terminals positioned to advance within compartments of a plastic case in accordance with the principles of the present invention.

Attention is now directed to FIG. 2 which illustrates an open-ended plastic box or case 22 having individual compartments 23. The box 22 is molded from a thermoplastic such as styrene-phenylene oxide sold under the tradename "NORYL 190" by the General Electric Company, Inc. Positioned on opposite sides of the box 22 are two arrays of terminals 16 which are heated and advanced through opposed walls 24 and 26 of each compartment 23. As shown in FIG. 3, the carrier strips 14 are gripped in suitable jaws 27 and 28 of a conventional feed mechanism. The dash lines 29 and 31 illustrate the application of heat to the terminal shank 17. The heat may be derived by a resistance heating of the terminal shanks or by applying radiant or induction heating to the terminals. The heat may also be applied from a laser source. In any event, the heat must be sufficient to raise the temperature of the terminal shanks to a value that will permit heat softening of the plastic from which the box 22 is constructed as well as being of sufficient value to effectuate a softening or partial melting of the end electrodes 11 and 12.

The jaws 27 and 28 are advanced towards each other to move the heated terminal shanks 17 through the opposed walls 24 and 26 of the box 22. Immediately thereafter a pair of shear blades 32 and 33 as illustrated in FIG. 4 are moved to shear the lead sections 19 from the carrier strips 14. In the alternative, the terminal severing step may be delayed until after the terminals are bonded to the end electrodes 11 and 12.

Next a capacitor blank 10 is moved into each of the compartments 23, whereupon the end electrodes 11 and 12 act to flex the terminal shanks 17 into firm engagement with the end electrodes. The heated terminal shanks partially melt the engaged end electrodes 11 and 12 to bond the tinned terminals to the end electrodes. If needed, additional heat may be applied to insure the complete bonding of the engaged portions of the terminal shanks 17 and the end electrodes.

The final steps of the method are illustrated in FIG. 6 which shows a compartment 23 as being filled with an encapsulate 36 to engulf the capacitor blank 10. Many types of moisture resistant, insulating encapsulates can be used such as various types of epoxy resins. The terminal leads 19 are bent upwardly to provide two rows of substantially parallel leads suitable for insertion or bonding to a circuit board. The final configuration of the packaged capacitors is compatible to that of the dual in-line packages used to package circuit modules and, thus, conventional assembly machines can be used to insert the packaged capacitors on printed circuit boards or other mounting structures. The enlarged sections 18 of the terminals act as stops in limiting the degree of insertion of the terminals in holes formed in a circuit board.

It is to be understood that the present invention is also applicable to manufacture of single cell packages having one or more capacitors in a thermoplastic box.

I claim:

1. A method of assembling leads to a boxed electrical component, which comprises:

heating a pair of terminals;

moving the heated terminals through and into a thermoplastic box; and inserting the component into the box to deflect the terminals into engagement with sections of the component.

2. A method of assembling leads to a component as defined in claim 1, wherein the component has heat activated bonding material applied to the engaged sections of the component, and the heat applied to the terminal is sufficient to activate the heat activated bonding material.

3. A method of assembling an electrical component and a terminal within a thermoplastic case, which comprises:

applying a heat activated conductive bonding material to the component:

heating a terminal to a temperature sufficient to soften the thermoplastic case and to activate the bonding material;

forcing the heated terminal through the case; and moving the electrical component into the case to flex the terminal against the bonding material while heat activating the bonding material to bond the terminal to the component.

4. A method of bonding terminal leads to a boxed electrical component having terminal pads of heat activated bonding material, which comprises:

heating a pair of terminal leads to a temperature sufficient to activate the heat activated bonding material;

moving the pair of terminals through opposed walls of a box constructed of thermoplastic material that is softened at a temperature below that needed to activate the heat activated material; and inserting the component into the box to defect the terminals into mechanical engagement with the terminal pads while heat activating and bonding the pads to the terminals.

5. A method of manufacturing of a capacitor device, which comprises:

forming two spaced planar arrays of elongated terminals with each terminal of each array aligned with a terminal in the other array;

positioning a multi-compartment box between said spaced arrays of terminals, with each compartment aligned with a pair of opposed terminals, said box being constructed of thermoplastic material;

heating the arrays of terminals to a temperature sufficient to heat soften the thermoplastic box;

advancing the arrays of terminals toward each other to pierce the opposed walls of the box to move a pair of terminals into each compartment;

inserting a capacitor in each box compartment, each of the capacitors having a pair of heat fusible electrodes which bear against and deflect the pairs of terminals in each compartment; and maintaining the heat to a degree sufficient to soften the heat fusible electrodes and bond the terminals to capacitors.

6. A method of manufacturing a capacitor device as set forth in claim 5, wherein the forming step includes the shaping of the opposed ends of the terminals into points.

7. A method of manufacturing a capacitor device as set forth in claim 5, which comprises the further step of:

filling each compartment of the box with sufficient encapsulating material to submerge each bonded capacitor.

8. A method of manufacturing a capacitor device as set forth in claim 5, wherein the forming step includes stamping each array of terminals from a separate strip of metal with webs connecting the terminals; and
cutting the terminals from the webs following the advance of the arrays of terminals into the compartments.

* * * * *